US012600352B2

(12) United States Patent
　　Takehira

(10) Patent No.:　US 12,600,352 B2
(45) Date of Patent:　　Apr. 14, 2026

(54) VEHICLE DRIVING SUPPORT DEVICE

(71) Applicant: TOYOTA JIDOSHA KABUSHIKI KAISHA, Toyota (JP)

(72) Inventor: Yuichi Takehira, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 18/739,349

(22) Filed: Jun. 11, 2024

(65) Prior Publication Data

US 2025/0136097 A1　　May 1, 2025

(30) Foreign Application Priority Data

Oct. 31, 2023　(JP) ................................. 2023-186397

(51) Int. Cl.
　　*B60W 30/09*　　(2012.01)
　　*B60W 30/095*　　(2012.01)
　　*B60W 40/10*　　(2012.01)
　　*B62D 6/00*　　(2006.01)
(52) U.S. Cl.
　　CPC .......... *B60W 30/09* (2013.01); *B60W 30/095* (2013.01); *B60W 40/10* (2013.01); *B62D 6/001* (2013.01); *B60W 2420/403* (2013.01); *B60W 2420/408* (2024.01); *B60W 2520/04* (2013.01); *B60W 2520/06* (2013.01)
(58) Field of Classification Search
　　CPC .... B60W 30/09; B60W 30/095; B60W 40/10; B60W 2420/403; B60W 2420/408; B60W 2520/04; B60W 2520/06; B60W 30/0956; B62D 6/001; B62D 15/0265

USPC .......................................................... 701/41
See application file for complete search history.

(56) References Cited

U.S. PATENT DOCUMENTS

| | | | |
|---|---|---|---|
| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2017/0369054 | A1* | 12/2017 | Nishimura .......... B60W 30/095 |
| 2021/0061309 | A1 | 3/2021 | Kawanaj |
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |

(Continued)

FOREIGN PATENT DOCUMENTS

JP　　2017-226393 A　　12/2017

*Primary Examiner* — Scott A Reinbold
(74) *Attorney, Agent, or Firm* — SoraIP, Inc.

(57)　　　　ABSTRACT

The driving support ECU calculates a first avoidance path for avoiding collision between the host vehicle and the continuous structure only by automatic braking, a second avoidance path for avoiding collision between the host vehicle and the continuous structure by forward automatic steering, and a third avoidance path for avoiding collision between the host vehicle and the continuous structure by reverse automatic steering when it is determined that there is a possibility that the host vehicle collides with an end portion of the continuous structure. The driving support ECU selects, as the final collision avoidance path, an avoidance path in which the collision avoidance operation (any of the automatic braking, the forward automatic steering, and the reverse automatic steering) is started at the latest among the avoidance paths.

6 Claims, 6 Drawing Sheets

(56)        References Cited

U.S. PATENT DOCUMENTS

2021/0146958 A1      5/2021  Tanaka et al.
2022/0234654 A1 *    7/2022  Kakeshita  .............. B62D 6/002

* cited by examiner

FIG. 5

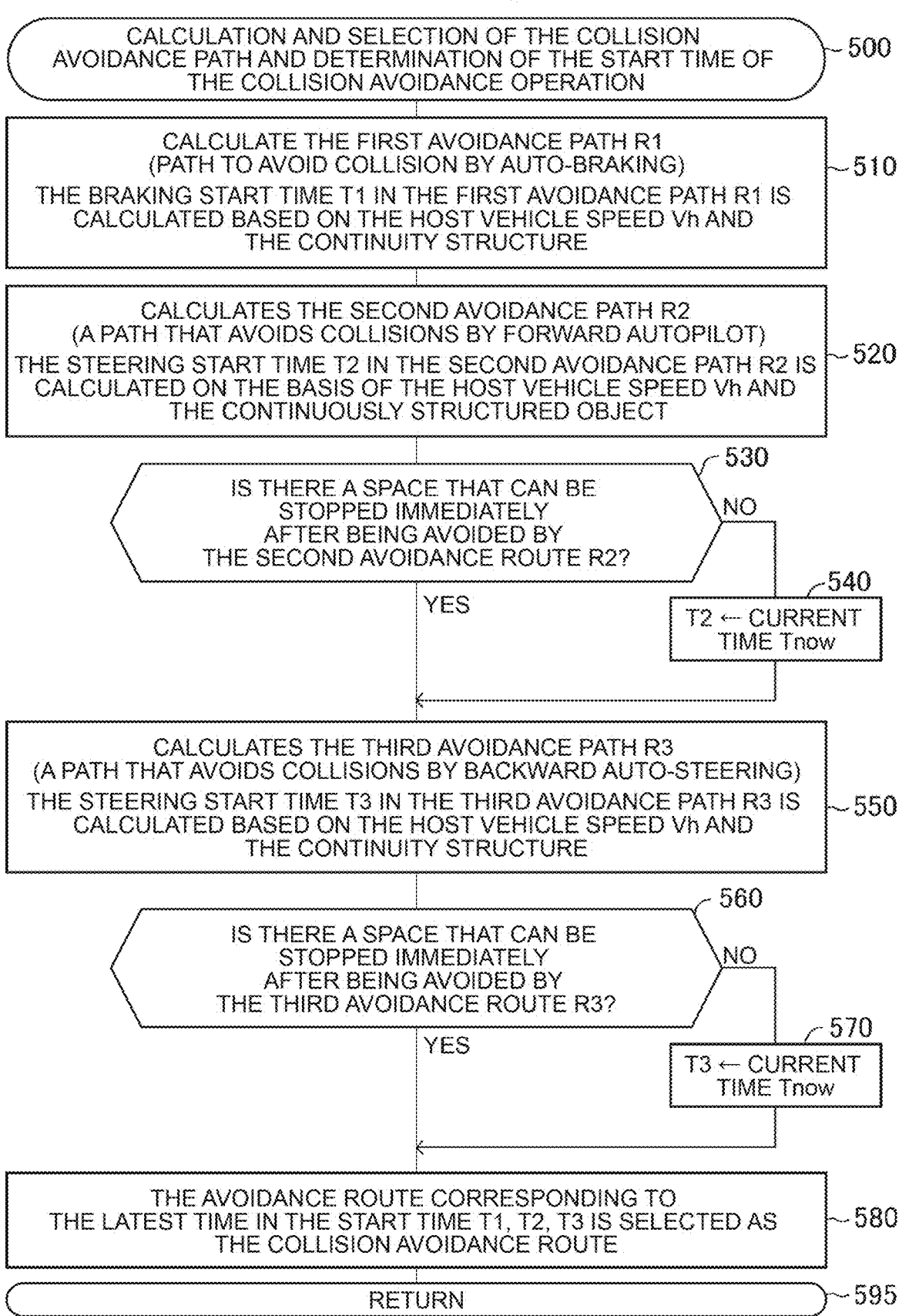

CALCULATION AND SELECTION OF THE COLLISION
AVOIDANCE PATH AND DETERMINATION OF THE START TIME OF
THE COLLISION AVOIDANCE OPERATION ~500

CALCULATE THE FIRST AVOIDANCE PATH R1
(PATH TO AVOID COLLISION BY AUTO-BRAKING)
THE BRAKING START TIME T1 IN THE FIRST AVOIDANCE PATH R1 IS
CALCULATED BASED ON THE HOST VEHICLE SPEED Vh AND
THE CONTINUITY STRUCTURE ~510

CALCULATES THE SECOND AVOIDANCE PATH R2
(A PATH THAT AVOIDS COLLISIONS BY FORWARD AUTOPILOT)
THE STEERING START TIME T2 IN THE SECOND AVOIDANCE PATH R2 IS
CALCULATED ON THE BASIS OF THE HOST VEHICLE SPEED Vh AND
THE CONTINUOUSLY STRUCTURED OBJECT ~520

IS THERE A SPACE THAT CAN BE
STOPPED IMMEDIATELY
AFTER BEING AVOIDED BY
THE SECOND AVOIDANCE ROUTE R2? ~530

NO

YES

T2 ← CURRENT
TIME Tnow ~540

CALCULATES THE THIRD AVOIDANCE PATH R3
(A PATH THAT AVOIDS COLLISIONS BY BACKWARD AUTO-STEERING)
THE STEERING START TIME T3 IN THE THIRD AVOIDANCE PATH R3 IS
CALCULATED BASED ON THE HOST VEHICLE SPEED Vh AND
THE CONTINUITY STRUCTURE ~550

IS THERE A SPACE THAT CAN BE
STOPPED IMMEDIATELY
AFTER BEING AVOIDED BY
THE THIRD AVOIDANCE ROUTE R3? ~560

NO

YES

T3 ← CURRENT
TIME Tnow ~570

THE AVOIDANCE ROUTE CORRESPONDING TO
THE LATEST TIME IN THE START TIME T1, T2, T3 IS SELECTED AS
THE COLLISION AVOIDANCE ROUTE ~580

RETURN ~595

VEHICLE DRIVING SUPPORT DEVICE

CROSS-REFERENCE TO RELATED APPLICATION

This application claims priority to Japanese Patent Application No. 2023-186397 filed on Oct. 31, 2023, incorporated herein by reference in its entirety.

BACKGROUND

1. Technical Field

The present disclosure relates to a vehicle driving support device that performs collision avoidance operation so that a host vehicle does not collide with a continuous structure such as a guardrail and a side wall.

2. Description of Related Art

A conventional device delays the timing to start "automatic braking (automatic brake) or automatic steering" as collision avoidance operation when an obstacle located in the advancing direction of the host vehicle is a continuous structure as compared with when the obstacle is not a continuous structure (see Japanese Unexamined Patent Application Publication No. 2017-226393 (JP 2017-226393 A)). Accordingly, the possibility that the collision avoidance operation is executed before the driver himself/herself starts a driving operation for avoiding a collision is reduced, and thus it is possible to reduce the frequency at which the driver feels uncomfortable about the collision avoidance operation.

SUMMARY

As shown in FIGS. 2 and 3, however, the conventional device does not consider a situation in which a host vehicle HV collides with an end Pe of a continuous structure CS on the host vehicle side. As shown in FIGS. 2 and 3, such a situation is taken into consideration for a first avoidance path R1 for avoiding a collision by automatic braking alone and a second avoidance path R2 for avoiding a collision by performing automatic steering such that the host vehicle HV is directed along the longitudinal direction of the continuous structure CS. However, such a situation is not taken into consideration for a third avoidance path R3 for avoiding a collision by performing automatic steering such that the advancing direction of the host vehicle HV intersects the longitudinal direction of the continuous structure CS. Therefore, according to the conventional device, in a scene in which the host vehicle is likely to collide with an end portion of a continuous structure, collision avoidance operation may be executed before the driver himself/herself starts a driving operation for avoiding a collision. There is a problem that the frequency at which the driver feels uncomfortable about the collision avoidance operation cannot be sufficiently reduced.

The present disclosure has been made to address such an issue. That is, an object of the present disclosure is to provide a vehicle driving support device capable of further reducing the frequency at which a driver feels the intervention of collision avoidance operation annoying in a scene in which there is a possibility that the host vehicle collides with an end portion of a continuous structure.

An aspect of the present disclosure provides a vehicle driving support device (DS) that performs collision avoidance operation when an obstacle is present in a predetermined area in an advancing direction of a host vehicle (S405) to avoid a collision between the host vehicle and the obstacle (S450), the vehicle driving support device being configured to, when determination is made that the obstacle is a continuous structure (CS) and that there is a possibility that the host vehicle collides with an end portion (Pe) of the continuous structure on a side of the host vehicle (S430), calculate a first time (T1) as a start time of automatic braking, in which a braking force is applied to the host vehicle and which is executed as the collision avoidance operation, when the host vehicle is caused to travel according to a first avoidance path (R1) for avoiding a collision between the host vehicle and the continuous structure by stopping the host vehicle before the end portion (S510);

calculate a second avoidance path (R2) for avoiding a collision between the host vehicle and the continuous structure by causing the host vehicle to pass through an area on the host vehicle side of the continuous structure by varying the advancing direction of the host vehicle by executing automatic steering as the collision avoidance operation;

calculate a second time (T2) as a start time of the automatic steering for causing the host vehicle to travel according to the second avoidance path (R2) (S520);

calculate a third avoidance path (R3) for avoiding a collision between the host vehicle and the continuous structure by causing the host vehicle to pass through an area at a side of the end portion (Pe) of the continuous structure so as to intersect a longitudinal direction of the continuous structure by executing automatic steering as the collision avoidance operation; calculate a third time (T3) as a start time of the automatic steering for causing the host vehicle to travel according to the third avoidance path (R3) (S550);

select one of the first avoidance path (R1), the second avoidance path (R2), and the third avoidance path (R3) corresponding to a latest time of the first time (T1), the second time (T2), and the third time (T3) as a (final) collision avoidance path (S580); and start the collision avoidance operation corresponding to the selected collision avoidance path at the latest time (S450).

According to this aspect, not only the first avoidance path (R1) for avoiding a collision with the end portion (Pe) of the continuous structure by the automatic braking and the second avoidance path (R2) for avoiding a collision with the end portion of the continuous structure by causing the host vehicle to pass through the "area on the host vehicle side of the continuous structure" by the automatic steering, but also the third avoidance path (R3) for avoiding a collision with the continuous structure by causing the host vehicle to pass through the area at a side of the end portion (Pe) of the continuous structure by intersecting the host vehicle with the longitudinal direction of the continuous structure by the automatic steering is considered as a candidate for the collision avoidance path. Among these paths, a path for which the collision avoidance operation is started the latest is adopted as the final collision avoidance path. As a result, the timing to start the collision avoidance operation is delayed, and thus the possibility that the collision avoidance operation is executed before the driver recognizing the continuous structure starts a driving operation for avoiding a collision can be reduced. As a result, it is possible to reduce the frequency at which the driver feels uncomfortable about the collision avoidance operation.

In this case, preferably, the second avoidance path (R2) is not selected as the collision avoidance path when there is no vehicle stop space (SP1) that enables the host vehicle to stop without colliding with another obstacle at and after a time point when the host vehicle has avoided a collision with the continuous structure when the host vehicle is caused to travel according to the second avoidance path (S530, S540, S440). Further, preferably, the third avoidance path (R3) is not selected as the collision avoidance path when there is no vehicle stop space (SP2) that enables the host vehicle to stop without colliding with another obstacle at and after a time point when the host vehicle has avoided a collision with the continuous structure when the host vehicle is caused to travel according to the third avoidance path (S560, S570, S440). This is because an avoidance path that leaves no space in which the host vehicle can be safely stopped after a collision with the continuous structure has been success-fully avoided by the automatic steering is not suitable as the final collision avoidance path.

In the above description, in order to facilitate understand-ing of the present disclosure, names and/or symbols used in the embodiment to be discussed later are provided in paren-theses for components of the disclosure corresponding to the embodiment. However, the constituent elements of the pres-ent disclosure are not limited to those according to the embodiment prescribed by such names and/or symbols. The present disclosure also encompasses a vehicle driving sup-port method and a storage medium thereof.

BRIEF DESCRIPTION OF THE DRAWINGS

Features, advantages, and technical and industrial signifi-cance of exemplary embodiments of the disclosure will be described below with reference to the accompanying draw-ings, in which like signs denote like elements, and wherein:

FIG. 5 is a sub-routine executed by CPU of the driving support ECU shown in FIG. 1.

DETAILED DESCRIPTION OF EMBODIMENTS

The "vehicle driving support device DS (hereinafter, referred to as "device DS") according to the embodiment of the present disclosure includes the components illustrated in FIG. 1, and is applied to (mounted on) the host vehicle HV. The host vehicle HV may be any of a vehicle using an internal combustion engine as a power source, a vehicle using an electric motor as a power source (that is, a battery electric vehicle), a hybrid electric vehicle, and the like.

As used herein, an "ECU" is an electronic controller (control unit) that includes a microcomputer that includes a CPU (processor), a ROM, RAM, data-writable non-volatile memories, interfaces, and the like. ECU are also referred to as controllers or computers. The ROM, RAM and data-writable non-volatile memories are each an example of a storage medium. The plurality of ECU illustrated in FIG. 1 are connected to each other through a CAN so as to be able to exchange information. Some or all of these ECU may be integrated into one ECU.

Figure 1:
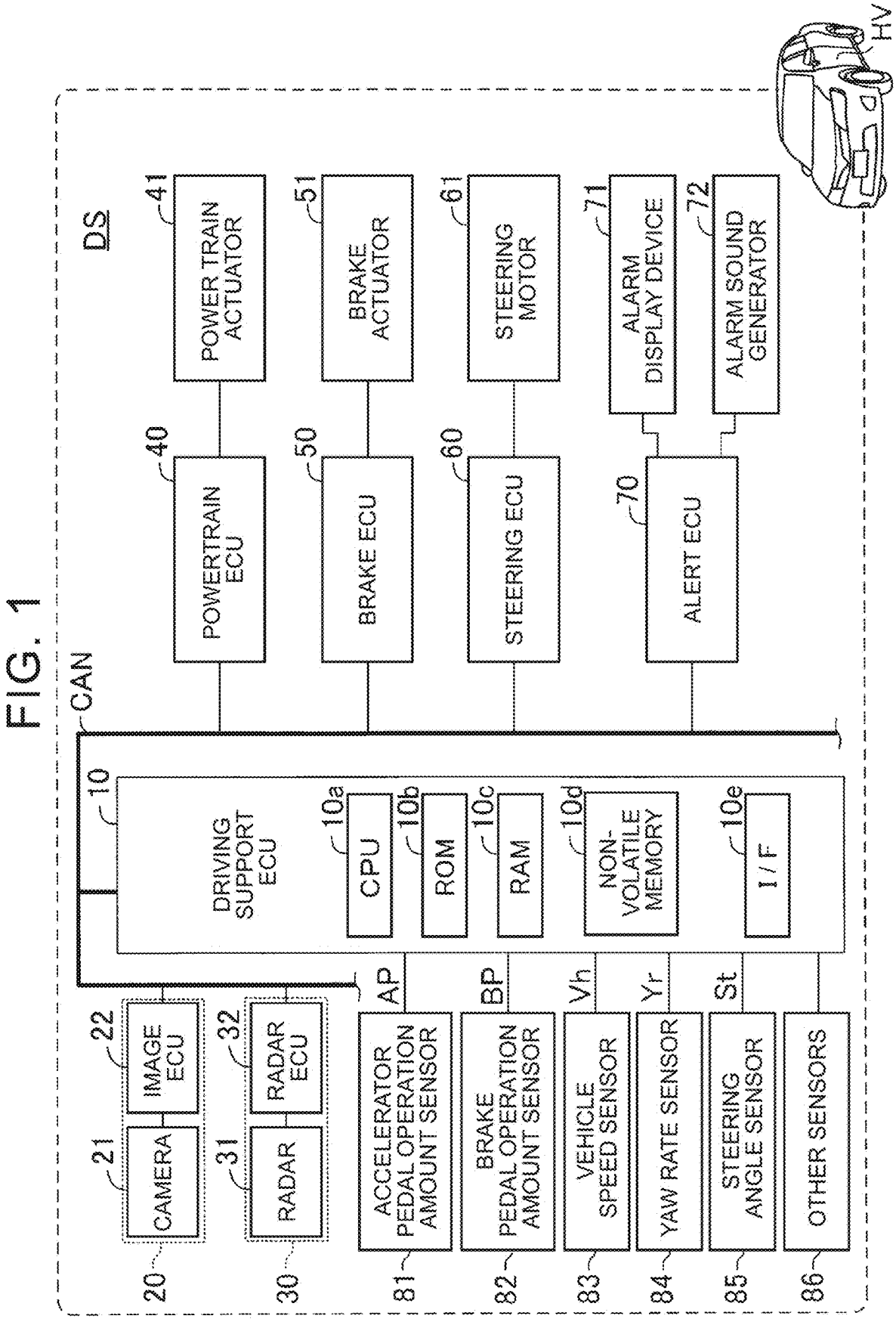
FIG. 1 is a schematic configuration diagram of a vehicle driving support device according to an embodiment of the present disclosure.

The driving support ECU 10 performs collision-avoid-ance control using the components described in FIG. 1.

The camera device 20 includes a camera 21 and an image ECU 22. Each time a predetermined period of time elapses, the camera 21 captures a scene in front of the vehicle HV and acquires image-data. The image ECU 22 generates camera information by analyzing the image data from the camera 21, and transmits the camera information to the driving support ECU 10. The camera information includes camera target information such as the image data itself, the position of the captured target object with respect to HV of the host vehicle, the relative longitudinal speed, the relative lateral speed, and the type. The types of targets include moving objects such as other vehicles and pedestrians, and structures that do not move. The structure further includes single structures such as poles and poles and continuous structures such as guardrails and sidewalls. The continuous structure is a structure having a thickness (length in the depth direction) equal to or smaller than a thickness thresh-old, a horizontal length (length in the longitudinal direction) equal to or larger than a length threshold, and having a substantially constant height.

The radar device 30 is a well-known device that acquires information about a target object existing in the vicinity of the host-vehicle HV by using a millimeter-wave band radio wave, and includes a radar 31 and a radar ECU 32. Each time a predetermined time elapses, the radar 31 transmits milli-meter waves within a predetermined detection range and receives millimeter waves reflected by the target object. The radar 31 transmits the transmitted and received millimeter-wave data to the radar ECU 32. The radar ECU 32 acquires radar information based on the information from the radar 31, and transmits the radar information to the driving support ECU 10. The radar information includes a distance to the target, an orientation of the target, a relative velocity of the target, and the like.

Figure 2:
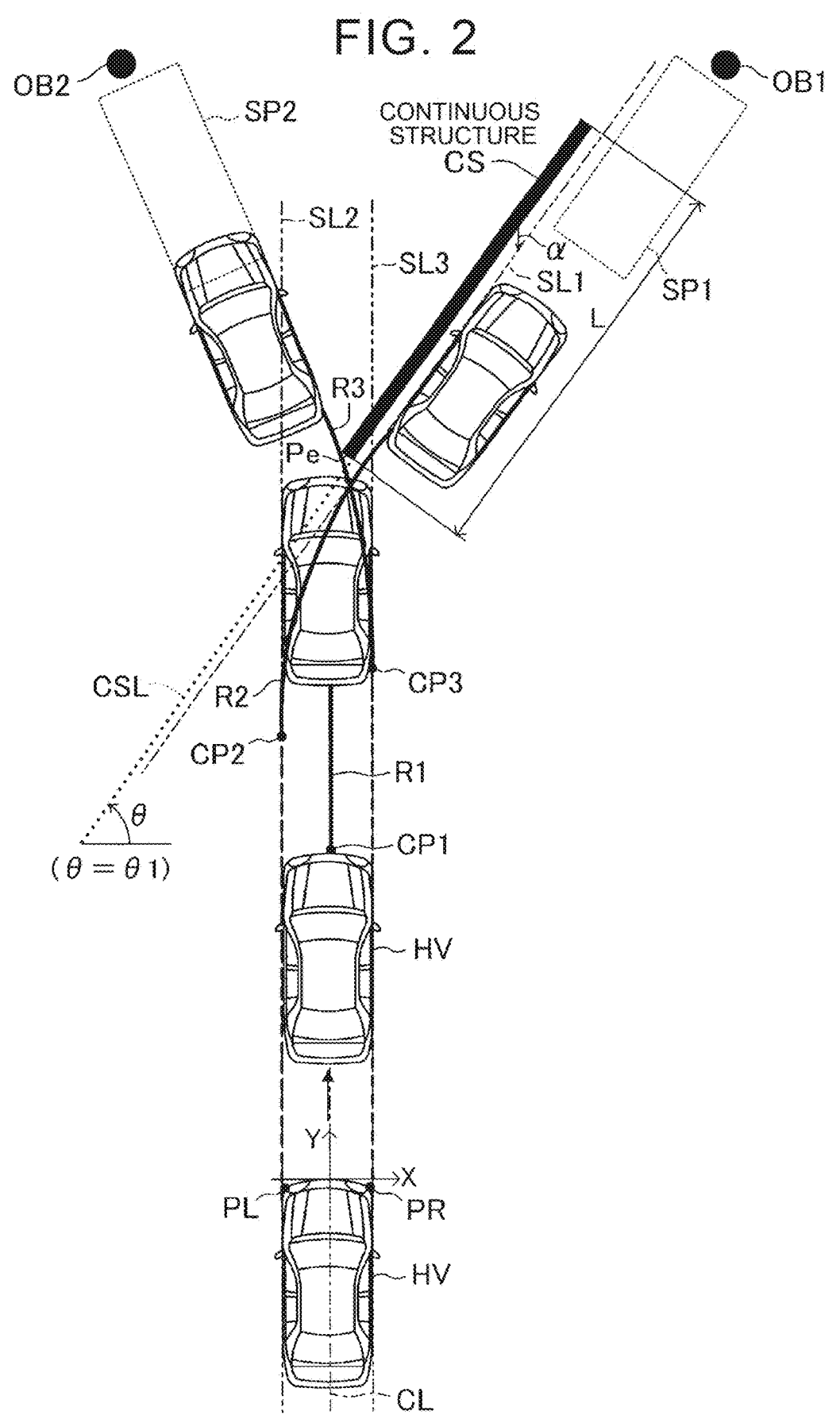
FIG. 2 is a plan view showing an avoidance path for avoiding collision with a continuous structure.

The driving support ECU 10 integrates the camera infor-mation and the radar information, and generates fusion target information including a position of the target (a longitudinal distance to the target, a lateral position of the target, and a target orientation), a relative velocity of the target, and a type of the target. Further, the driving support ECU 10 recognizes the position of the target object by using X-Y coordinates with respect to the own-vehicle HV. As illustrated in FIG. 2, the Y-axis of X-Y coordinate is a central axis CL extending in the front-rear direction of the own-vehicle HV, and the X-axis is an axis extending in a direction perpendicular to the central axis CL. The origin of X-Y coordinates is the vehicle width-direction center of the front end of the own vehicle HV.

The powertrain ECU 40 drives the powertrain actuator 41 to control a driving device including a power source of an own-vehicle HV (not shown), thereby generating a driving force.

The brake ECU 50 controls a braking device on the host vehicle HV (not shown) by driving the brake actuator 51, thereby applying a braking force to the host vehicle HV. The brake ECU 50 can drive the brake actuator 51 in response to an instruction from the driving support ECU 10 to automati-cally brake the own vehicle HV (the own vehicle HV can be provided with the automatic brake).

The steering ECU 60 controls the steering device of the host vehicle HV (not shown) by driving the steering motor 61, thereby changing the steering angle of the host vehicle HV. The steering ECU 60 can drive the steering motor 61 in response to an instruction from the driving support ECU 10 to automatically steer the own-vehicle HV.

The warning ECU 70 can control the warning display device 71 which is arranged at a position visible from the driver's seat and performs predetermined display, and the warning sound generation device 72 which generates a warning sound in response to an instruction from the driving support ECU 10.

The driving support ECU 10 receives the detected values (output values) of the following "sensors and switches".

An accelerator pedal operation amount sensor 81 that detects an accelerator pedal operation amount AP of the own-vehicle HV.

A brake pedal operation amount sensor 82 that detects a brake pedal operation amount BP of the host vehicle HV.

Vehicle speed sensor 83 that detects the speed of the host vehicle HV (that is, the host vehicle speed Vh).

A yaw rate sensor 84 for detecting a yaw rate Yr of the own-vehicle HV.

A steering angle sensor 85 for detecting a steering angle St of the own-vehicle HV.

Other sensor groups 86 such as a steering torque sensor, a front-rear acceleration sensor, and a lateral acceleration sensor.

Overview of Operation

Figure 3:
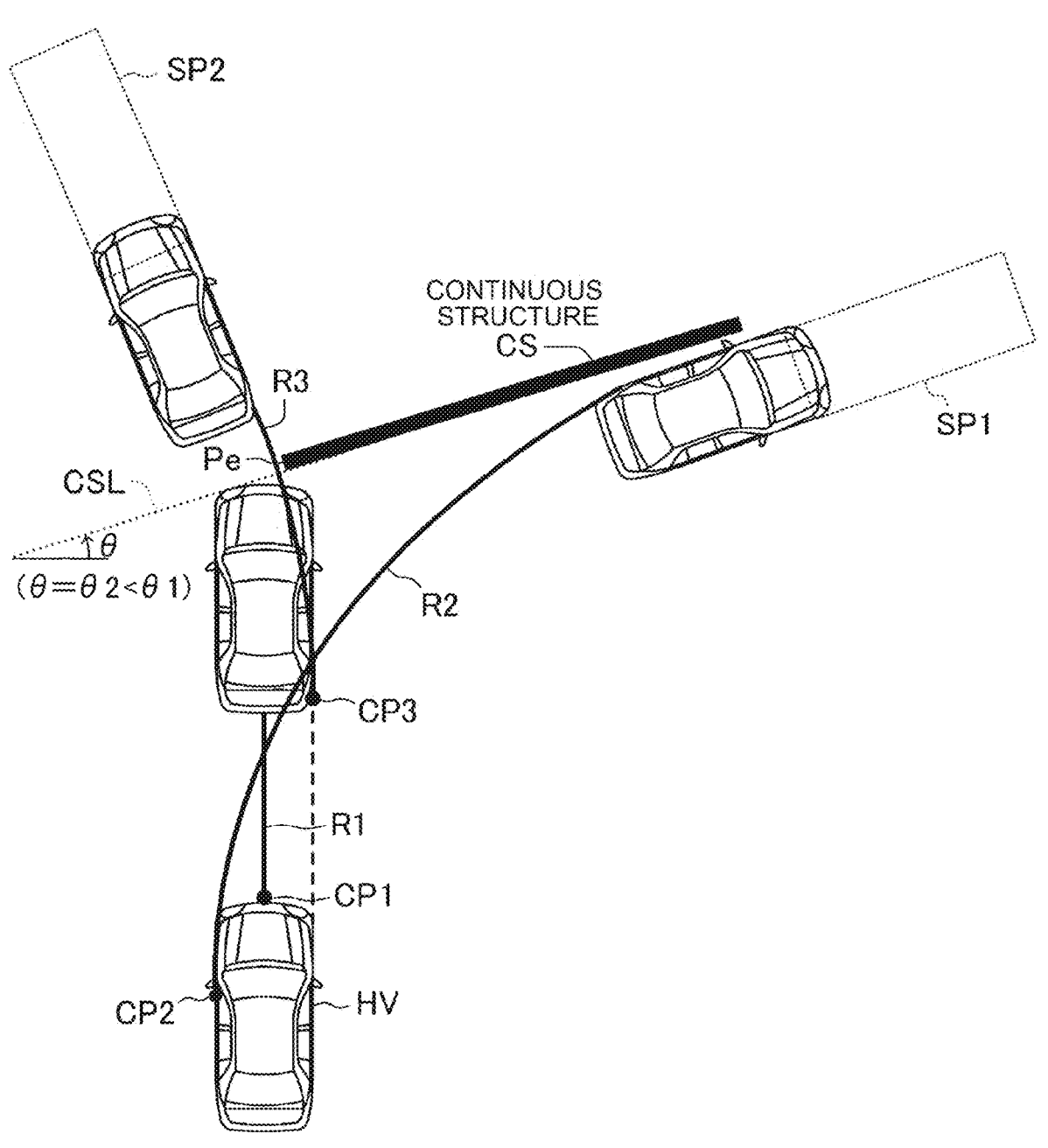
FIG. 3 is a plan view showing an avoidance path for avoiding collision with a continuous structure.

As illustrated in FIGS. 2 and 3, when an obstacle exists in a predetermined area in the traveling direction of the host vehicle HV and the obstacle is the continuous structure CS, the device DS determines whether or not there is a possibility that the host vehicle HV collides with the end Pe of the continuous structure CS on the host vehicle side. The device DS calculates the following three types of avoidance paths for avoiding collision between the host vehicle HV and the end Pe when it is determined that there is a possibility that the host vehicle HV collides with the end Pe.

(1) The first avoidance path R1 is a path in which the own vehicle HV is stopped in front of the end Pe by executing an automatic braking operation for applying a braking force to the own vehicle HV as a collision avoidance operation.

(2) Second avoidance path R2: A path for causing the host vehicle HV to pass through the "region of the continuous structure CS on the host vehicle side" by executing autopilot as a collision avoidance operation to change the traveling direction of the host vehicle HV.

(3) Third avoidance path R3: A path for causing the host vehicle HV to intersect the longitudinal direction of the continuous structure CS by changing the traveling direction of the host vehicle HV by executing autopilot as a collision avoidance operation and passing through a region (a region where the continuous structure CS does not exist) on the side of the end Pe of the continuous structure.

Then, the device DS calculates a time (first time, first timing) T1 at which the automatic braking is started in the first avoidance path R1, a time (second time, second timing) T2 at which the automatic steering is started in the second avoidance path R2, and a time (third time, third timing) T3 at which the automatic steering is started in the third avoidance path R3. The device DS selects the avoidance path corresponding to the latest time among them as the final collision avoidance path. When the present time coincides with the "latest time", the device DS starts a collision avoidance operation in which the start time corresponds to the latest time when there is a possibility that the own-vehicle HV and the end Pe still collide with each other.

Specific operation

Figure 4:
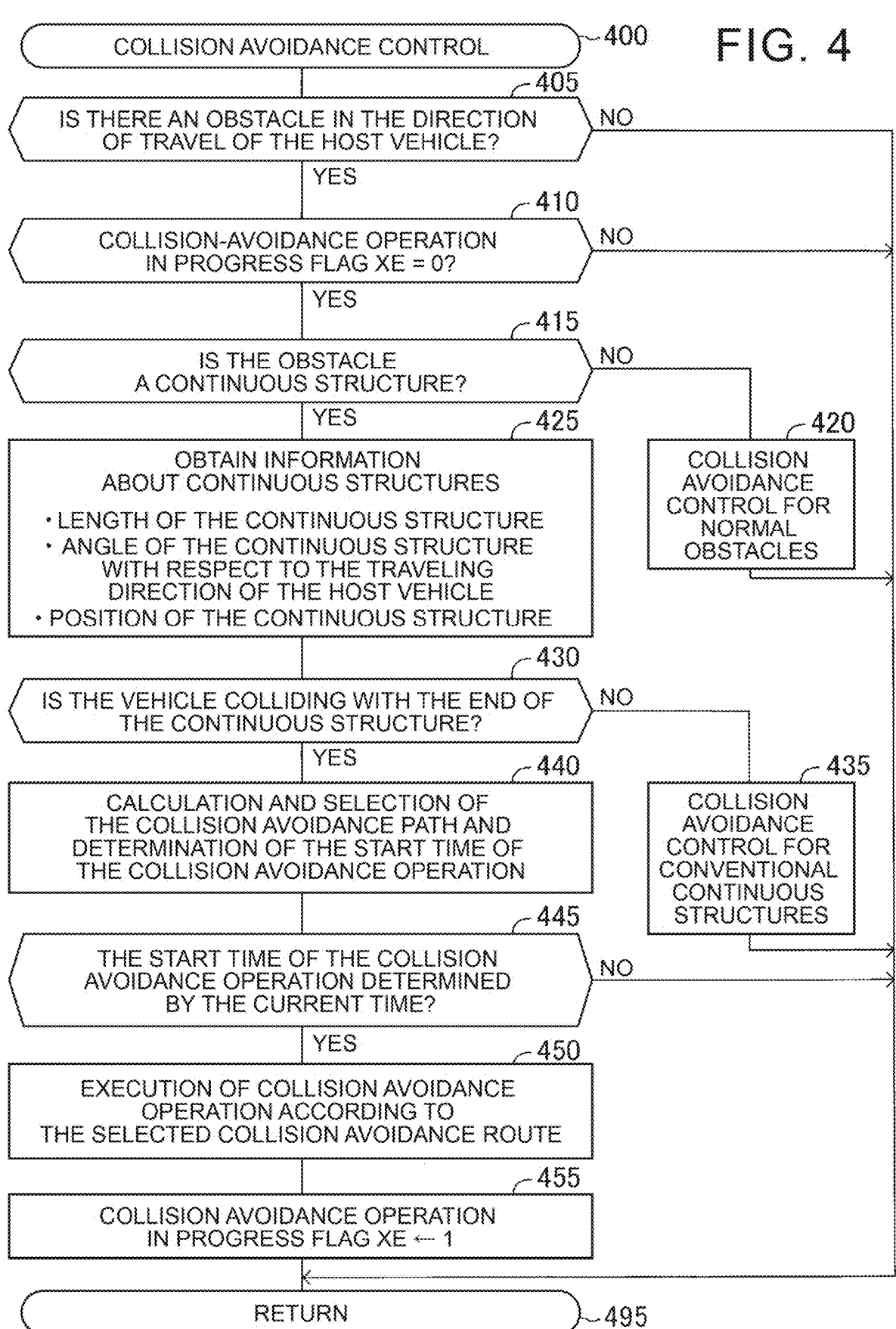
FIG. 4 is a routine executed by CPU of the driving support ECU shown in FIG. 1.

In CPU 10a of the driving support ECU 10 (hereinafter, simply referred to as "CPU"), the routine illustrated by the flow chart in FIG. 4 is executed every predetermined period (calculation cycle) dt elapses. In the following description, "step" is referred to as "S".

At a predetermined timing, CPU starts the process from S400 of FIG. 4 and proceeds to S405 to determine whether or not an obstacle is present in the traveling direction of the host vehicle HV. More specifically, CPU determines whether or not an obstacle exists in an area having a vehicle width (or a value obtained by adding a margin to the vehicle width) of the host vehicle HV as a width and extending in the traveling direction of the host vehicle HV and having a distance from the distal end portion of the host vehicle HV within a "predetermined distance determined according to the host vehicle speed Vh" on the basis of the host vehicle speed Vh and the fusion target information. That is, CPU determines whether or not there is a target (obstacle) that is considered to collide with the host vehicle HV within a predetermined constant period when the host vehicle HV maintains the current "steering angle and host vehicle speed Vh". When there is no obstacle in the traveling direction of the own-vehicle HV, CPU proceeds directly from S405 to S495 and terminates the routine once.

On the other hand, when an obstacle is present in the traveling direction of the host-vehicle HV, CPU proceeds from S405 to S410 and determines whether or not the collision-avoiding operation executing flag XE is "0". The flag XE is set to "1" when some kind of collision avoidance operation is executed by the collision avoidance control described later. The flag XE is set to "O" in an initialization routine (not shown) executed by CPU when the ignition key switch of the host vehicle HV (not shown) is changed from the off position to the on position. If the flag XE is not '0', CPU proceeds directly from S410 to S495.

When the collision-avoidance-operation-in-progress flag XE is "0", CPU proceeds from S410 to S415. CPU determines, based on the fusion target information (in particular, camera information), whether or not the obstacle determined to be located in the traveling direction of the host vehicle HV is a continuous structure. For example, the driving support ECU 10 learns in advance the features on images of "guard-rails, side walls, and the like" which are typical examples of the consecutive structures. On the other hand, CPU extracts the features of the object captured from the images included in the image data. CPU determines whether the obstacle corresponds to one of the consecutive structures by comparing the features on the image being learned with the features extracted from the image data (i.e., using a pattern matching technique). Accordingly, CPU determines whether or not the obstacle is a continuum. Alternatively, CPU may draw the position and the shape of the target acquired by the fusion target information on a two-dimensional map that is a plan view, and determine whether the obstacle is a continuum based on the drawn shape.

If the obstacle is not a contiguous structure, CPU proceeds from S415 to S420 and performs the well-known "collision-avoidance control for normal obstacles (moving objects and single structures)". CPU sets the value of the collision avoidance operation executing flag XE to "1" when any collision avoidance operation is started by the known collision avoidance control. CPU then proceeds to S495.

On the other hand, when the obstacle is a continuous structure, CPU proceeds from S415 to S425 and acquires the following information (continuous structure information) regarding the continuous structure from the fusion target information.

Horizontal (longitudinal) length L of the continuous structure CS (see FIG. 2).

Angle θ of the continuous structure CS with respect to the X-axis (see FIG. 2).

The position of the continuous structure CS (the position on X-Y at the current position of the own-vehicle HV).

Next, CPU proceeds to S430 and determines whether or not there is a possibility that the host vehicle HV may collide with the end Pe (see FIGS. 2 and 3) of the continuous structure CS on the host vehicle. That is, when the host vehicle HV maintains the current "steering angle and host vehicle speed Vh", CPU determines whether or not the host vehicle HV reaches the end Pe of the continuous structure CS on the host vehicle HV.

When there is no possibility that the host vehicle HV collides with the end Pe of the continuous structure CS on the host vehicle side, CPU proceeds from S430 to S435 and executes "collision avoidance control for a normal continuous structure CS (for example, refer to Japanese Unexamined Patent Application Publication No. 2017-226393 (JP 2017-226393 A))". Note that CPU sets the value of the collision avoidance operation executing flag XE to "1" when any collision avoidance operation is started by the collision avoidance control with respect to the normal continuous structure CS. CPU then proceeds to S495.

On the other hand, when there is a possibility that the host vehicle HV collides with the end Pe of the continuous structure CS on the host vehicle side, CPU proceeds from S430 to S440 and performs calculation of the collision avoidance path, selection, and determination of the start time (start timing) of the collision avoidance operation.

More specifically, when CPU proceeds to S440, the process of the sub-routine of FIG. 5 starts from S500 and proceeds to S510.

In S510, CPU calculates, in the "first avoidance path R1 for avoiding collision with the continuous structure CS only by the automatic braking as the collision avoidance operation" illustrated in FIGS. 2 and 3, a braking start time (that is, a time at which the brake actuator 51 is started to be operated via the brake ECU 50) T1 of the automatic braking based on the "host vehicle speed Vh and information on the continuous structure acquired in S425 of FIG. 4, and the like".

More specifically, in a state in which the host vehicle HV maintains the current traveling direction, when the host vehicle HV is decelerated at a constant deceleration from the current host vehicle speed Vh by using the braking force generated by the braking device, CPU calculates an automatic braking start time T1 for stopping the host vehicle HV prior to colliding with the continuous structure CS (at a position on HV of the host vehicle by a predetermined distance from the continuous structure). This auto-braking start time T1 is also referred to as "first time T1" for convenience.

Next, CPU calculates, in S520, a "second avoidance path R2 for avoiding collision with the continuous structure CS by performing auto-steering as a collision avoidance operation such that the traveling direction of the host vehicle HV passes through the region of the continuous structure CS on the host vehicle side along the longitudinal direction of the continuous structure CS" illustrated in FIGS. 2 and 3. This automatic steering is also referred to as "forward automatic steering" for convenience. Further, CPU calculates a steering start time (that is, a time at which the steering motor 61 is started to be operated via the steering ECU 60) T2 for driving the host vehicle HV along the calculated second avoidance path R2, based on the host vehicle speed Vh and the data on the continuous-structure acquired by S425. This steering start time T2 is also referred to as "second time T2" for convenience.

As an example, in the scene shown in FIG. 2, CPU calculates a plurality of circular arcs in contact with both of a straight line SL1 obtained by translating a straight line CSL along the surface of the continuous structure CS on the vehicle side in a plan view by a predetermined margin distance a on the vehicle HV side, and a straight line SL2 parallel to the central axis CL passing through the left-end portion PL of the vehicle HV in a plan view. CPU calculates the lateral acceleration of the host vehicle HV when the host vehicle HV passes at the current host vehicle speed Vh according to each of the plurality of arcs. Then, among the plurality of calculated lateral accelerations, a lateral acceleration that is equal to or less than the allowable lateral acceleration threshold and is the largest is selected, and a circular arc corresponding to the selected lateral acceleration is selected as the second avoidance path R2. Further, CPU obtains a time at which the left-end portion PL of the host vehicle HV reaches a contact CP2 between the selected second avoidance path R2 and the straight line SL2, as a steering start time T2 (that is, a second time T2), based on the current host vehicle speed Vh.

Next, CPU proceeds to S530 to determine whether or not there is a vehicle stop space (see SP1 in FIG. 2) on the host vehicle HV immediately after the point in time when the host vehicle HV is moved along the second avoidance path R2 and the host vehicle HV avoids collision with the continuous structure CS (that is, the first point in time when the traveling direction of the host vehicle HV is parallel to the longitudinal direction of the continuous structure CS). More specifically, at the first time point, even if CPU determines that another obstacle (refer to OB1 of FIG. 2) is present in the traveling direction of the host vehicle HV or that the traveling road through which the host vehicle HV can pass has ended, it determines whether or not the host vehicle HV can safely be stopped when the auto braking is started from the first time point.

When the vehicle HV that has moved along the second avoidance path R2 does not have a stopping space on the host vehicle HV immediately after the time point (the first time point) at which the collision with the continuous structure CS is avoided, CPU proceeds from S530 to S540. CPU sets the steering start time (second time) T2 to "present time Tnow" for convenience in order to prevent the second avoidance path R2 from being selected as the collision avoidance path. CPU then proceeds to S550. On the other hand, if there is a stopping space on the host vehicle HV immediately after the first time point, CPU proceeds directly from S530 to S550.

Next, in S550, CPU calculates the "third avoidance path R3 for avoiding collision with the continuous structure CS by performing auto-steering as a collision avoidance operation such that the direction of the host vehicle HV intersects the longitudinal direction of the continuous structure CS" illustrated in FIGS. 2 and 3. This automatic steering is also referred to as "reverse automatic steering" for convenience. Further, CPU calculates a steering starting time (that is, a time at which the steering motor 61 is started to be operated via the steering ECU 60) T3 for driving the host vehicle HV along the calculated third avoidance path R3, based on the host vehicle speed Vh and the data on the continuous structure acquired by S425. This steering starting time T3 is also referred to as "third time T3" for convenience.

As an example, in the scene shown in FIG. 2, CPU calculates a plurality of arcs that is in contact with a straight line SL3 passing through the end Pe of the continuous structure CS on the vehicle HV side in a plan view and parallel to the central axis CL passing through the right end portion PR of the vehicle HV in a plan view. CPU calculates the lateral acceleration of the host vehicle HV when the host vehicle HV passes at the current host vehicle speed Vh according to each of the plurality of arcs. Then, among the plurality of calculated lateral accelerations, a lateral acceleration that is equal to or less than the allowable lateral acceleration threshold and is the largest is selected, and a circular arc corresponding to the selected lateral acceleration is selected as the third avoidance path R3. Further, CPU obtains a time at which the right-end portion PR of the host vehicle HV reaches the contact point CP3 between the selected third avoidance path R3 and the straight line SL3 as a steering starting time (third time) T3 based on the current host vehicle speed Vh.

Next, CPU proceeds to S560 to determine whether or not a vehicle stop space (see SP2 in FIG. 2) of the host vehicle exists in the traveling direction of the host vehicle HV at a time point when the host vehicle HV is moved along the third avoidance path R3 and the host vehicle HV avoids collision with the continuous structure CS (that is, at a second time point when the right rear end portion of the host vehicle HV intersects with the extension line CSL in the longitudinal direction of the continuous structure CS). More specifically, at the second time point, even if CPU determines that another obstacle (refer to OB2 of FIG. 2) is present in the traveling direction of the host vehicle HV or that the traveling road through which the host vehicle HV can pass has ended, it determines whether or not the host vehicle HV can safely be stopped when the auto braking is started from the second time point.

When the vehicle HV that has moved along the third avoidance path R3 does not have a stopping space on the host vehicle HV immediately after the time point (the second time point) at which the collision with the continuous structure CS is avoided, CPU proceeds from S550 to S570. CPU sets the steering starting time (third time) T3 to "present time Tnow" for convenience in order to prevent the third avoidance path R3 from being selected as the collision avoidance path. CPU then proceeds to S580. On the other hand, if there is a stopping space on the host vehicle HV immediately after the second time point, CPU proceeds directly from S560 to S580.

In S580, CPU selects the latest time (the time farthest from the present time Tnow) among the first time T1, the second time T2, and the third time T3, and selects an avoidance route corresponding to the selected time as the final avoidance route. For example, when the second time T2 is the latest time, CPU determines the second time T2 as the starting time of the collision avoidance operation and selects the second avoidance path R2 corresponding to the second time T2 as the collision avoidance path. CPU then proceeds to S595 and proceeds to 445 of FIG. 4.

In S445, CPU determines whether or not the current time (present time) coincides with the starting time of the collision-avoidance operation determined in S440. If the current time does not coincide with the starting time of the collision-avoidance operation, CPU proceeds directly from S445 to S495. Therefore, in this case, the collision avoidance operation is not started.

On the other hand, when the present time coincides with the start time of the collision avoidance operation determined by S440, CPU proceeds from S445 to S450 and starts the collision avoidance operation corresponding to the collision avoidance path selected by S440.

Next, CPU proceeds to S455, sets the value of the collision-avoidance-operation-in-progress flag XE to "1", proceeds to S495, and ends the routine.

As described above, the device DS avoids the collision between the host vehicle HV and the end Pe of the continuous structure CS according to the route in which the collision avoidance operation starts at the latest among the first avoidance path R1, the second avoidance path R2, and the third avoidance path R3. For example, in the exemplary embodiments illustrated in FIGS. 2 and 3, since the time when the host-vehicle HV reaches the point CP3 is the latest, the collision-avoidance operation using the third avoidance path R3 is executed. Further, if the vehicle stop space SP2 is not present, the collision-avoidance operation using the third avoidance path R3 is not performed. In the embodiment shown in FIG. 2, a collision avoidance operation using the second avoidance path R2 is performed. In the embodiment shown in FIG. 3, a collision avoidance operation using the first avoidance path R1 is performed.

Figure 6:
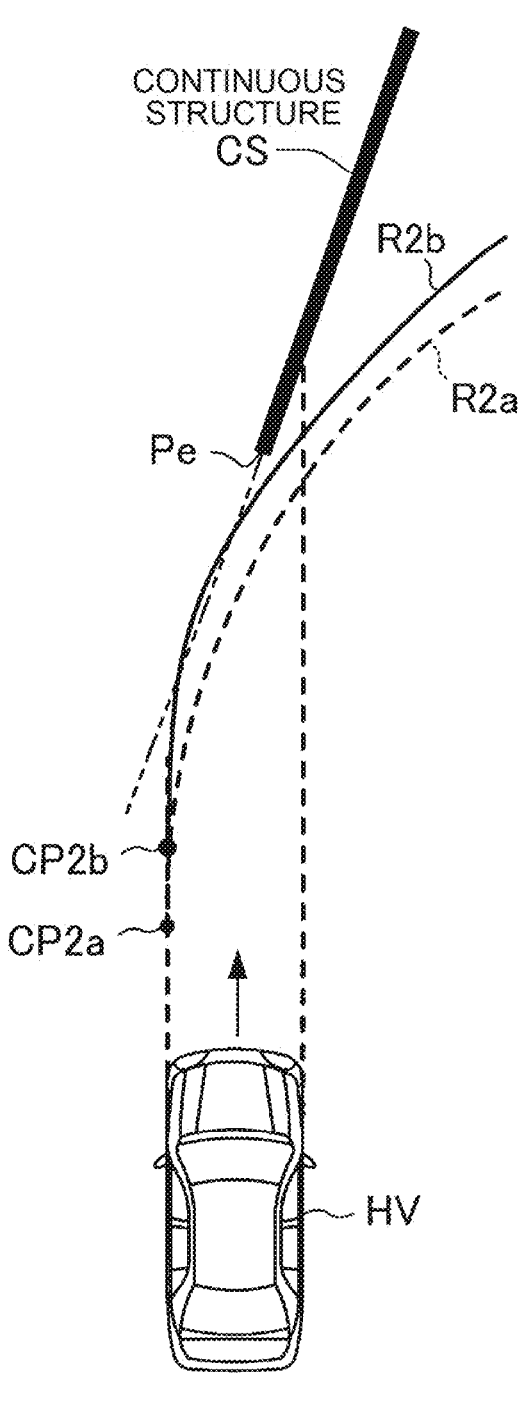
FIG. 6 is a plan view illustrating an avoidance path for avoiding collision with a continuous structure.

Further, according to the above-described embodiment, as illustrated in FIG. 6, as the second avoidance path, "path R2b for avoiding the end Pe" is calculated instead of "path R2a when the continuous structure CS is present in the entire traveling direction of the host vehicle HV without considering the end Pe". The starting time of the forward autopilot for the second avoidance path may be a later time (see point CP2b and point CP2a).

The present disclosure is not limited to the above-described embodiments, and various modifications can be adopted within the scope of the present disclosure. For example, the methods for calculating the second avoidance path R2 and the third avoidance path R3 are not limited to the above-described methods. For example, the driving support ECU 10 may store, in advance, in the form of a look-up table, a relation between the lap rate Rp of the host vehicle HV assuming that the host vehicle HV collides with the end Pe of the continuous structure CS, the host vehicle speed Vh, and the radii of the circular arc indicating the path for collision avoidance. The driving support ECU 10 obtains the respective radii of the second avoidance path R2 and the third avoidance path R3 by applying the actual lap rate Rp and the actual current host vehicle speed Vh to the look-up table. The driving support ECU 10 calculates the second avoidance path R2 and the third avoidance path R3 based on the arc of the determined radii. Further, the driving support ECU may calculate these paths using the machine-learned AI that derives the optimum "second avoidance path R2 and third avoidance path R3" from the host vehicle speed Vh and the above-described consecutive structure information. Further, in the embodiments illustrated in FIGS. 2 and 3, the host vehicle HV is traveling straight, but the present disclosure can also be applied when the host vehicle HV is turning.

In addition, the driving support ECU 10 may acquire, from the map-information included in the navigation ECU (not shown), whether or not there is a space that may become a vehicle stop space (SP1, SP2). Further, for example, the present disclosure is applicable to a host vehicle in which a driving mode is transitioned from automatic driving to driving by a driver in an automatic driving vehicle.

What is claimed is:

1. A vehicle driving support device that performs collision avoidance operation in a case where an obstacle is present in a predetermined area in an advancing direction of a host vehicle to avoid a collision between the host vehicle and the obstacle, the vehicle driving support device comprising:

a camera configured to acquire image data of a scene in front of the host vehicle;

a radar configured to acquire radar data by transmitting millimeter waves within a predetermined detection range and receiving millimeter waves reflected by the obstacle, the radar data indicating a distance to the obstacle and an orientation of the obstacle with respect to the host vehicle; and a processor configured to generate obstacle information based on the image data acquired from the camera and the radar data acquired from the radar, the obstacle information including image data of the obstacle and position data of the obstacle, the position data indicating a position of the obstacle with respect to the host vehicle on an x-y coordinate system, the x-y coordinate system including an origin located at a front end of the host vehicle, a y-axis extending in a front-rear direction of the host vehicle, and an x-axis extending in a left-right direction of the host vehicle, determine whether the obstacle is a continuous structure based on the obstacle information, wherein the processor extracts features of the obstacle from the image data of the obstacle, compares the extracted features with learned features of the continuous structure that are learned by the processor in advance, and determines that the obstacle is the continuous structure in a case where the extracted features match the learned features, and determine whether the host vehicle reaches an end portion of the continuous structure on a side of the host vehicle when the host vehicle maintains a current steering angle and a current vehicle speed based on information of the continuous structure obtained from the obstacle information, in a case where it is determined that the obstacle is the continuous structure, wherein the processor is further configured to, in a case where it is determined that the host vehicle reaches the end portion of the continuous structure when the host vehicle maintains the current steering angle and the current vehicle speed, calculate a first time as a start time of automatic braking, in which a braking force is applied to the host vehicle and which is executed as the collision avoidance operation, when the host vehicle is caused to travel according to a first avoidance path for avoiding a collision between the host vehicle and the continuous structure by stopping the host vehicle before the end portion, calculate a second avoidance path for avoiding a collision between the host vehicle and the continuous structure by causing the host vehicle to pass through an area on the host vehicle side of the continuous structure by varying the advancing direction of the host vehicle by executing automatic steering as the collision avoidance operation, calculate a second time as a start time of the automatic steering for causing the host vehicle to travel according to the second avoidance path, calculate a third avoidance path for avoiding a collision between the host vehicle and the continuous structure by causing the host vehicle to pass through an area at a side of the end portion of the continuous structure so as to intersect a longitudinal direction of the continuous structure by executing automatic steering as the collision avoidance operation, calculate a third time as a start time of the automatic steering for causing the host vehicle to travel according to the third avoidance path, select one of the first avoidance path, the second avoidance path, and the third avoidance path corresponding to a latest time of the first time, the second time, and the third time as a collision avoidance path, and start the collision avoidance operation corresponding to the selected collision avoidance path at the latest time.

2. The vehicle driving support device according to claim 1, wherein the second avoidance path is not selected as the collision avoidance path when there is no vehicle stop space that enables the host vehicle to stop without colliding with another obstacle at and after a time point when the host vehicle has avoided a collision with the continuous structure when the host vehicle is caused to travel according to the second avoidance path.

3. The vehicle driving support device according to claim 1, wherein the third avoidance path is not selected as the collision avoidance path when there is no vehicle stop space that enables the host vehicle to stop without colliding with another obstacle at and after a time point when the host vehicle has avoided a collision with the continuous structure when the host vehicle is caused to travel according to the third avoidance path.

4. The vehicle driving support device according to claim 1, wherein the processor is further configured to acquire the information of the continuous structure from the obstacle information, the information of the continuous structure including a longitudinal length of the continuous structure, an angle between an extending direction of the continuous structure and the x-axis, and a position of the continuous structure on the x-y coordinate system, and determine whether the host vehicle reaches the end portion of the continuous structure on the side of the host vehicle when the host vehicle maintains the current steering angle and the current vehicle speed based on the acquired information of the continuous structure.

5. The vehicle driving support device according to claim 1, wherein the continuous structure is a wall.

6. The vehicle driving support device according to claim 1, wherein the origin of the x-y coordinate system is located at a center of the front end of the host vehicle in the left-right direction of the host vehicle.

* * * * *